Aug. 8, 1933.　　R. C. JONES ET AL　　1,921,928
METHOD OF MAKING FINNED TUBING
Filed Jan. 5, 1931　　3 Sheets-Sheet 1
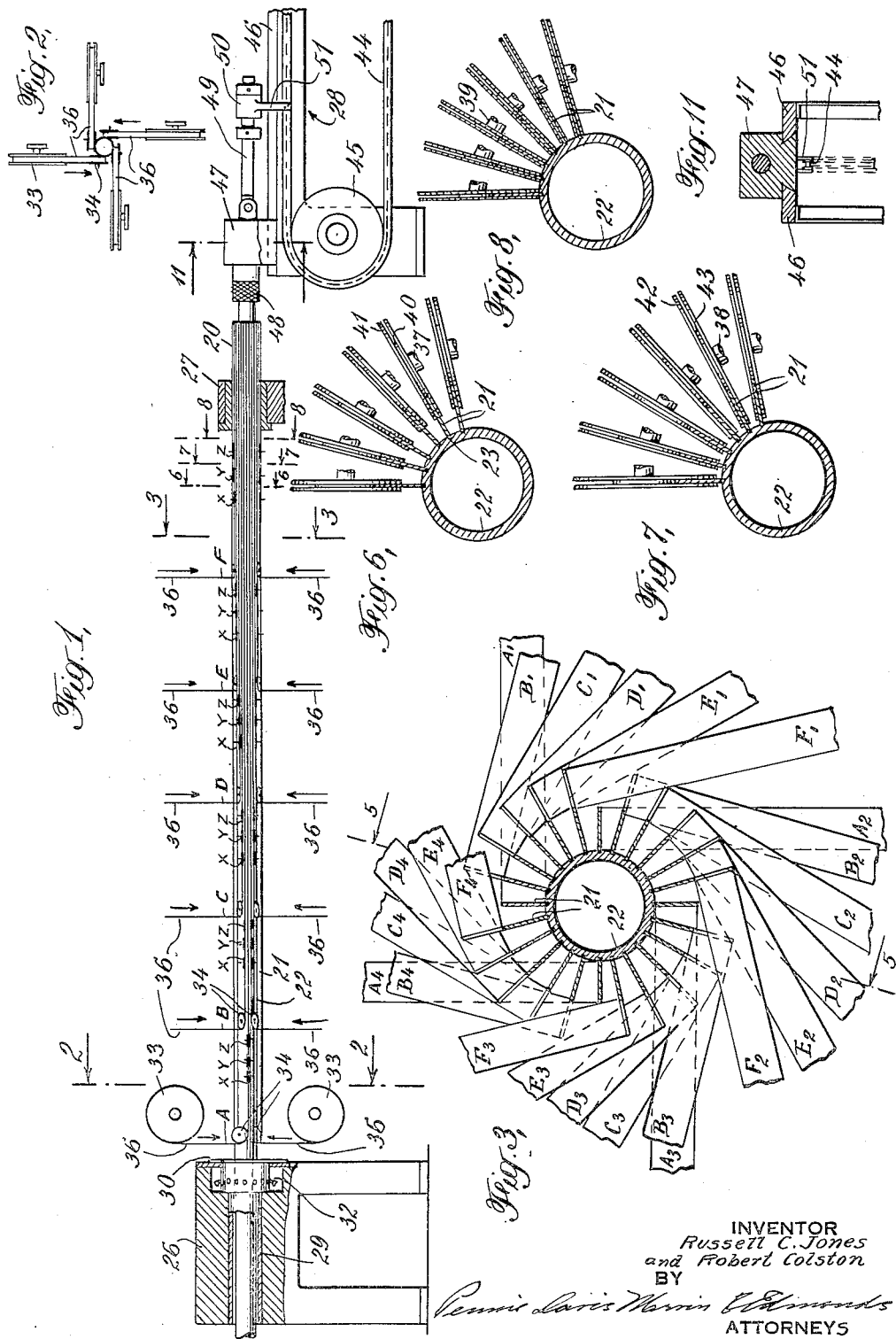
INVENTOR
Russell C. Jones
and Robert Colston
BY
ATTORNEYS

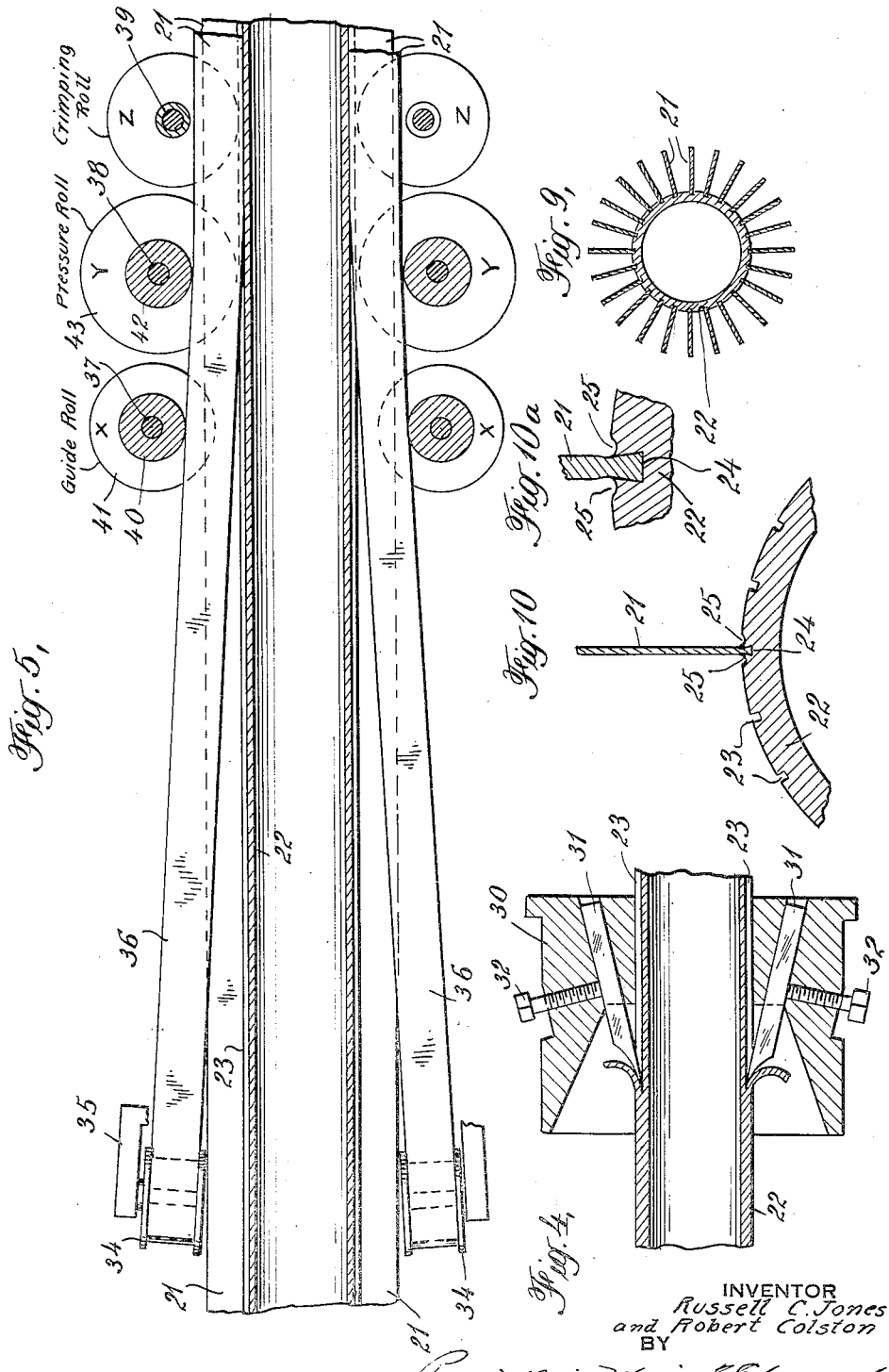

Aug. 8, 1933.  R. C. JONES ET AL  1,921,928
METHOD OF MAKING FINNED TUBING
Filed Jan. 5, 1931  3 Sheets-Sheet 3
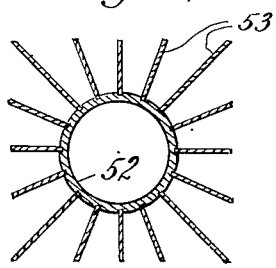
Fig. 12,
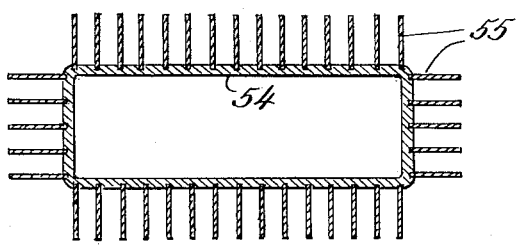
Fig. 13,
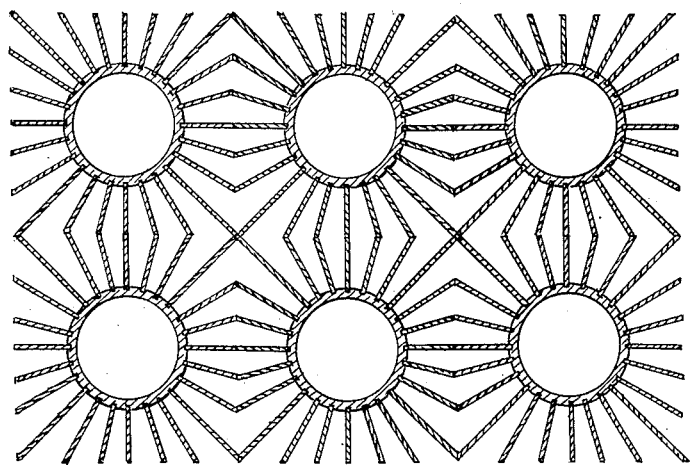
Fig. 14,
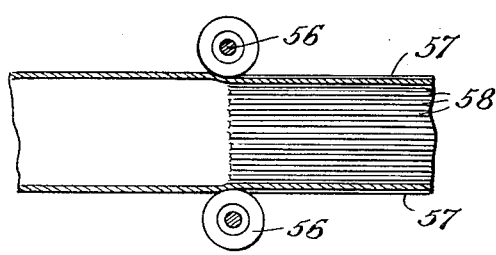
Fig. 16,
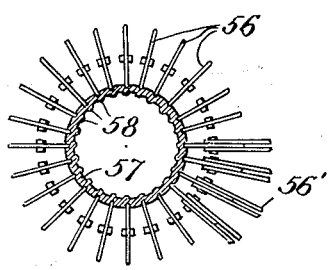
Fig. 15,
INVENTOR
Russell C. Jones
and Robert Colston
BY
ATTORNEYS Patented Aug. 8, 1933

1,921,928

UNITED STATES PATENT OFFICE 1,921,928

METHOD OF MAKING FINNED TUBING

Russell C. Jones, Bronxville, and Robert Colston, New Rochelle, N. Y., assignors to The Griscom-Russell Company, New York, N. Y., a Corporation of Delaware Application January 5, 1931, Serial No. 506,612, and in Canada July 16, 1930

2 Claims. (Cl. 29—157.3)

This invention relates to heat exchanging apparatus, and more particularly to a method for making tubing having fins projecting from the surface thereof to increase the surface area and thereby facilitate the rapid transfer of heat between mediums on the interior and exterior of the tube respectively. This application is a continuation in part of our copending application Serial Number 382,756, filed August 1, 1929.

The invention is concerned especially with the provision of such finned tubing in which the fins are arranged longitudinally of the tube. Finned tubing has heretofore been made with the fins arranged either in helical or circular form around the tube and also with the fins running lengthwise of the tube, in which the fins have been cast or formed integrally with the tube walls. Such tubing is, however, undesirable for one reason or another, such for example as high cost of manufacture, excessive weight, etc.

Accordingly the most practical method of making finned tubing is to make it in composite form, that is, to secure strips or ribbon of solid conducting material to the surface of a pre-formed tube. In the manufacture of finned tubing having helical or circular fins, this has heretofore been done successfully by winding the strip of fin material edgewise on the surface of the tube and then securing it in position by soldering so as to make a joint of high heat conductivity between the fin material and the tube. This method of making the tubing has proved successful where the fin strip surrounds the tube, since the fin strip is held in place largely by its own tensile strength, and there is no stress placed upon the soldered connection.

When, however, the fin strips are arranged longitudinally on the tube, the soldered connection has to be relied upon as the sole means of maintaining the fin in position and the strength of this connection is not sufficient to withstand the stresses to which the fins are subjected, and the use of wedges and wedge-shaped slots has been resorted to. This sort of connection is also undesirable because of high cost of manufacture and the fact that it is impossible to use it in making finned tubing of small diameter or having thin walls.

It is the object of the present invention to provide a composite finned tube on which the fins are arranged longitudinally in good heat conducting relation with the walls of the tube without the use of solder or brazing.

It is also the object of the invention to produce a tube having longitudinal fins which are mechanically united to the walls of the tube without the use of solder or brazing, and in such manner as to firmly fix them upon the tube.

A further object of the invention is to construct a finned tubing in which the fins are unusually wide in comparison to the diameter of the tubing.

The invention aims to provide a novel method for securing the fins to the tubing in a practical manner so as to enable the tubing to be produced rapidly and at reasonable cost of manufacture.

The invention will be described in connection with the accompanying drawings, in which Fig. 1 is a side elevation of a machine for making the longitudinal finned tubing.

Fig. 2 is a transverse section on a reduced scale on line 2—2 of Fig. 1 showing the manner of feeding into proximity to the tube fin strip for the first four fins to be applied to the tube.

Fig. 3 is a transverse section on an enlarged scale on line 3—3 of Fig. 1. This view is somewhat similar to Fig. 2, but shows the feeding of all of the fin strips into proximity to the tube.

Fig. 4 is a longitudinal section through the cutter mounting showing one mechanism for cutting the longitudinal grooves in the tube.

Fig. 5 is an enlarged longitudinal section showing the mechanism for inserting and securing the fin strip in two diametrically opposite grooves.

Fig. 6 is a transverse section taken on line 6—6 of Fig. 1 showing the guide rolls operating upon the fins being applied to one quadrant.

Fig. 7 is a similar view on line 7—7 showing the pressure rolls of the same quadrant.

Fig. 8 is also a similar view on line 8—8 showing the crimping rolls of the same quadrant.

Fig. 9 is an end view of a completed finned tube produced by the apparatus shown in the figures previously described.

Fig. 10 is an enlarged transverse section of a fragment of the tube showing the anchoring of a single fin in one of the grooves.

Fig. 10a is a greatly enlarged transverse section of a portion of the tube of Fig. 10, showing the manner in which the fins are secured to the tube.

Fig. 11 is a transverse section taken on line 11—11 of Fig. 1 showing a detail of construction.

Figs. 12 and 13 are transverse sectional views of modified forms of finned tubing.

Fig. 14 is a transverse section showing a plurality of the finned tubes of Fig. 12 arranged in a heat exchanger.

Fig. 15 is a view showing a modified form of groove-forming device in which the grooves are formed by rolls instead of by cutters, and Fig. 16 is a vertical section of Fig. 15 showing two of the rolls in side elevation and the internal ribs formed on the interior surface of the tube.

Referring now to the accompanying drawings, the improved longitudinal finned tube of my present invention is illustrated in end view in Fig. 9, and the portion of the tubing indicated by reference numeral 20 in Fig. 1 illustrates the product in side elevation. From Fig. 9 it will be seen that the fins 21 project radially from the exterior surface of the tube 22 in which they are embedded for a short distance at their bases, and in Fig. 10 it will be seen that the tube 22 is provided with longitudinal grooves 23 for the reception of the fins.

The bottom edges of the fins are inserted in these grooves and the metal of the tube is forced against the sides of the fin as indicated by way of example at 25 in Figs. 10 and 10a. The fins are thus secured to the tube by a joint in which the contiguous surfaces of the foot of the fins and the walls of the grooves are held in close contact. This insures a rapid conduction of heat from the walls of the tubes to the fins, and at the same time the metal of the tube is interlocked with the metal of the fins and affords a rugged means of securing the fins to the tube so that the fins will withstand severe mechanical stresses without being loosened or pulled away from the tube. When the metal of the tube is forced against the sides of the fin a dovetailed joint is formed by virtue of the fact that the crimping roll pinches the fin near the base thereof by pressing the edges of the groove firmly against the fin. If the groove is slightly wider than the fin then there is a tendency for the metal of the fin to be displaced to fill the base of the groove as illustrated for example in Figures 10 and 10a.

The apparatus for applying the fins to the tube comprises generally a head 26 through which the bare tube to which the fins are to be applied passes, a guide 27 near the opposite end of the machine, a tube-pulling mechanism indicated generally by reference numeral 28 at the extreme right end of the machine, and a plurality of fin-supplying, feeding, and applying devices disposed between the head 26 and the guide 27 and operating to apply the fin strip to the tube as it is pulled forward, that is, toward the right, by the tube-pulling mechanism 28.

The head 26 contains a sleeve 29 closely fitting the outside diameter of the tube and serving to smooth out any ridges that may be on the outside of the tube, and to firmly support the tube and maintain it in alignment with the guide 27. At the right hand side of head 26 there is mounted a removable collar 30 which forms the mounting for a plurality of cutters two of which are illustrated in the sectional view of Fig. 4. These cutters 31 are adjustably mounted by means of set screws 32 in converging channels in the collar 30 so that their cutting points may be properly adjusted to cut the grooves 23 to a uniform depth as the tube 22 is advanced through the head 26 under the action of the tube-pulling mechanism 28. There are as many cutters 31 as there are grooves to be cut and fins to be applied. In the example illustrated in the drawings, the finned tube is provided with twenty-four fins so that there are twenty-four cutters mounted in the collar 30.

The fin strip in the form of metal ribbon is supplied to the tubing from twenty-four magazine reels 33 arranged in groups of four each, the four reels of each group being arranged in pairs to feed the ribbon with one edge approximately tangent to the surface of the tube. The first group of supply reels designated A is illustrated in Fig. 2. The other five groups of four supply reels each are arranged at positions B, C, D, E and F, shown in Fig. 1. The ribbon 36 passes from the reels toward the tube in a general radial direction as shown in Figs. 1 and 5, and then over rotary guides 34 which are mounted on arms 35. These arms are arranged to maintain the trailing surface of each rotary guide approximately in alignment with one of the grooves 23 in the tube, and the rotary guides are arranged in groups of four each to correspond with the grouping of the magazine reels 33.

The four strips or ribbons 36 of fin material are simultaneously inserted and secured in their respective grooves by the mechanism illustrated in Fig. 5. This mechanism consists of a guide roll X, a pressure roll Y, and a crimping roll Z. These three rolls are of similar construction although they are of different dimensions depending upon the function each is to perform. They are each provided with two disc-like sides separated by a distance slightly greater than the thickness of the fin strip and maintained in this relation by means of a hub. The rolls are preferably made of hardened steel both to withstand wear and to provide sufficient stiffness. The respective rolls X, Y and Z, are mounted to rotate freely upon the supporting bearings 37, 38 and 39.

The ribbon 36 passes between the two sides 40 of the guide roll X and beneath its hub 41, this roll serving to guide the strip accurately in lateral alignment with the groove into which the strip is about to be inserted by the pressure roll Y, and the sides of the roll also serving to assist pressure roll Y in maintaining the fin strip in flat upright condition. Pressure roll Y is so mounted that its hub 42 bears firmly upon the outer edge of the fin strip 36. This pressure is sufficient to force the base or foot of the fin against the bottom of the groove 23. To assist in this action, the sides 43 of the pressure roll Y extend substantially throughout the entire width of the fin strip and almost touch the surface of the tube 22. They therefore support the relatively thin fin strip and prevent its buckling.

The pressure roll Y also serves to bend the fin strip 36 edgewise a slight amount as shown in Fig. 5. In this connection it is pointed out that the particular set of fin-applying rolls X, Y and Z illustrated in Fig. 5 operates upon fin ribbon 36 supplied at one of the positions other than position A since at the left of Fig. 5 can be seen two fins 21 which have been previously completely affixed to the tube. The rotary guides 34 for all of the positions except position A have to be mounted slightly more than the width of the fins from the surface of the tube, while rotary guides 34 for position A can be arranged close to the surface of the tubes. In this way each of the twenty-four ribbons 36 is fed with one edge in proximity to the surface of the tube without interference between the respective ribbons coming from the magazine reels. This is shown in the drawings in Fig. 3.

The roll Z is a crimping or knurling roll and accordingly the edges of both sides of the roll are preferably provided with teeth as shown in Fig. 8 so as to act upon the metal of the tube on both sides of the fins. The depth of this roll between the periphery and its hub is such that the periphery may engage the surface of the tube without having the hub touch the outer edge of the fin strip. The pressure of the roll against the surface of the tube forces the metal of the tube against both sides of the fin and firmly secures the fin material in position.

The crimping or knurling roll displaces the metal of the tube laterally and causes the sides of each groove to exert a tremendous biting power upon the sides of the fin strip which effectively retains the strip in the groove. The metal of the sides of the fin itself may be slightly displaced by the lateral pressure of the metal of the tube so as to cause an interlocking of the metal of the tube with the metal of the fin. This is particularly true when the crimping or knurling rolls are provided with teeth. The teeth are forced into the metal of the tube and cause it to be displaced to a greater extent at the points where the teeth contact with the tube than at the points between the teeth. The metal opposite the teeth, which is displaced to the greater extent, is forced laterally into the sides of the fin causing the metal of the tube to project into or interlock with the metal of the fin in rows of closely spaced points upon each side of the fin.

After the fin ribbon or strip 36 passes the crimping roll Z it is completely secured to the tube 22, and has become the fins 21 indicated by this numeral at the right hand end of Fig. 5.

The form of the joint between the fins and the tubing may be varied by varying the width of the grooves 23 with respect to the thickness of the fin strip. In the procedure as above described, it will be understood that the width of the grooves is substantially the same as the thickness of the fin strip so that the fin strip will fit snugly in the grooves. It will also be understood that the grooves can be narrowed slightly so as to somewhat increase the pressure required to be exerted by pressure roll Y so that the fins will make a force fit with the grooves.

When the metal of the tube is displaced by the crimping roll Z against the sides of the fin above the base, a dovetailed joint connection is formed due to the pressure on the fin. Instead of forming the grooves 23 of substantially the same width as the thickness of the fin strip, or narrower, the grooves may be made somewhat wider than the thickness of the fin strip, and the pressure of the crimping roll Z made sufficient to cause an upsetting or displacement of the metal of the fin to an extent which will cause it to fill the groove and engage the side walls of the groove with considerable force. The metal of the tube is displaced against the sides of the fin above the base 24 and produces a dovetailed joint connection.

By employing a fin material which is slightly harder than the metal of the tube 22, the separate formation of the grooves 23 by means of a cutter as previously described, or by a roll, can be dispensed with, and the fin strip can be pressed directly into the surface of the tube. The metal of the tube is then displaced against the sides of the fin as previously described, to complete the attachment of the fin strip to the tube.

The tube-pulling mechanism 28 comprises a chain 44 which passes over a pair of sprockets one of which is illustrated at 45 and which is driven by a suitable source of power at a speed suitable to the proper operation of the grooving and fin applying devices. Directly above the upper pass of the chain is a pair of longitudinal bars 46 which have finished upper and inner surfaces so as to permit a block 47 to slide thereon as illustrated in Fig. 11. Block 47 slides with a dovetailed connection with bars 46 so that the block is held rigidly against lateral movement or oscillation as it moves longitudinally of the bars.

Block 47 is provided at its forward end with a gripping device which may be engaged and disengaged from the end of the tube 22 by rotation of the knurled nut 48. The details of this gripping device are not illustrated, but it is constructed to firmly attach the tube to the block 47 so that block 47 and the bars 46 may serve to prevent the tube from rotating in either direction during the application of the fins since such rotation would tend to apply the fins to the tube in a wavy formation, or possibly even in a helix of steep pitch.

A rod 49 is pivoted at the front end of block 47 and provided with a device to be engaged by the chain 44 so as to positively impart the movement of the chain to the block and the tube attached thereto. This device preferably consists of a collar 50 loosely mounted on the rod, and provided with a downwardly projecting tongue 51 for insertion between the links of the chain. Collar 50 is slidable on the rod between fixed collars thereon so that the projection 51 can be shifted slightly when necessary to make it enter between the links of the chain.

Referring now to Figs. 12 to 14 inclusive, in Fig. 12 there is illustrated a circular tube 52 to the surface of which fins 53 suitably varied in width to make the periphery of the fins square in outline, have been applied. Such an arrangement of the fins is desirable because when the fins are made of copper or other good heat conducting material, the rate of heat conduction is rapid so that the extra surface area of the wide fins at the corners approximately makes up for the additional length of these fins. A fin tubing which is square in outline is very conveniently nested into a tube bundle to form a heat exchanger as shown in Fig. 14, and produces a heat exchanger providing a high rate of heat transfer in a small compass.

In Fig. 13 a still further modified form of tube has been illustrated. The tube 54 here shown is rectangular in cross-section instead of round, and the fins 55 are all of equal length as in the case of the tube previously described and illustrated in Fig. 9.

A modified form of grooving device is illustrated in Figs. 15 and 16, together with the modified form of finned tubing which may be produced thereby. Instead of the cutters 31 illustrated in Fig. 4, the longitudinal grooves in the tube are formed by a plurality of grooving rolls 56 mounted in spaced relation around the surface of the tube on supporting arms 56'. These rolls may all be mounted in a single plane transverse to the axis of the tube as illustrated in Fig. 15, or they may be mounted in groups corresponding to the fin ribbon feeding positions A, B, C, D, E and F of Fig. 1. If so mounted, however, they should be arranged so that approximately diagonally opposite portions of the tube will be grooved simultaneously. The cutters 31 may also be mounted in such groups if desired, instead of cutting all of the grooves for the entire circumference of the tube at the same point.

The tubing 57 grooves by the devices shown in Figs 15 and 16 differs from the tube previously described in that if the pressure exerted by the grooving rolls is sufficiently high in proportion to the thickness of the tube walls, longitudinal ribs 58 will be formed on the interior surface of the tube. These ribs have the advantages of increasing the rigidity of the tube and also of increasing to a certain extent the heat transfer area of the interior surface of the tube.

It will be appreciated that the finned tubing produced as described herein is of special utility because of the fact that the fins are affixed to the tubing in a manner to produce exceptionally good heat conduction between the walls of the tubing and the fins as well as a high degree of mechanical strength.

Moreover in the winding of fins helically upon the surface of tubing, there are certain limitations as to the width of fin which it is practicable to apply because of the fact that the fin ribbon has to be wound edgewise to completely encircle the tube. When applying the fins longitudinally however, this difficulty is avoided almost entirely since the fin only has to be bent edgewise a sufficient amount to allow the ribbon to be fed toward the tubing and clear the fins which have already been applied. The small degree of this edgewise bending can be seen in Fig. 5, and even this can be avoided where space conditions permit a length of machine which will allow a greater distance between the rotary guides 34 and the pressure roll Y so as to enable the fin strip 36 to be twisted slightly as it passes between these two elements of the machine. This slight twisting does away with the necessity of any edgewise bending whatever.

By applying the fin material simultaneously at points of the tube which are approximately diagonally opposite each other, even tubing which has comparatively thin walls may be finned without distortion.

The apparatus for making the finned tubing is not elaborate, is simple in operation, and of moderate cost. Our improved apparatus is claimed in our divisional application, Serial No. 594,564.

It is to be understood that the above is merely an exemplifying disclosure and that the scope of the invention is defined by the appended claims.

We claim:—

1. The method of making finned tubing which comprises forming longitudinal grooves in the surface of the tubing, and affixing fins in a plurality of said grooves at a plurality of positions spaced from one another longitudinally of the tubing so as to permit the feeding of said fins to the tubing without interference with one another.

2. The method of making finned tubing which comprises forming longitudinal grooves in the surface of the tubing, feeding a plurality of metal ribbons towards the tubing at a plurality of positions spaced longitudinally of the tubing, and affixing said ribbon to the tubing at a plurality of positions corresponding to said feeding positions.

RUSSELL C. JONES.
ROBERT COLSTON.